United States Patent
Lee et al.

(10) Patent No.: US 10,813,123 B2
(45) Date of Patent: Oct. 20, 2020

(54) METHOD AND APPARATUS FOR CHANGING SPS OPERATION IN WIRELESS COMMUNICATION SYSTEM

(71) Applicant: LG Electronics Inc., Seoul (KR)

(72) Inventors: Youngdae Lee, Seoul (KR); Hanbyul Seo, Seoul (KR); Myoungseob Kim, Seoul (KR); Seungmin Lee, Seoul (KR); Jaewook Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/098,304

(22) PCT Filed: Apr. 25, 2017

(86) PCT No.: PCT/KR2017/004350
§ 371 (c)(1),
(2) Date: Nov. 1, 2018

(87) PCT Pub. No.: WO2017/191917
PCT Pub. Date: Nov. 9, 2017

(65) Prior Publication Data
US 2019/0149279 A1 May 16, 2019

Related U.S. Application Data

(60) Provisional application No. 62/330,255, filed on May 2, 2016.

(51) Int. Cl.
*H04W 72/14* (2009.01)
*H04W 72/04* (2009.01)
(Continued)

(52) U.S. Cl.
CPC .......... *H04W 72/14* (2013.01); *H04L 1/1819* (2013.01); *H04L 1/1887* (2013.01);
(Continued)

(58) Field of Classification Search
CPC ......... H04W 76/14; H04W 4/40; H04W 4/46; H04W 4/70; H04W 72/048; H04W 72/0493
See application file for complete search history.

(56) References Cited

U.S. PATENT DOCUMENTS 8,379,585 B2 2/2013 Lee et al.
8,706,129 B2 4/2014 Wu
(Continued)

FOREIGN PATENT DOCUMENTS

WO 2015058382 4/2015

OTHER PUBLICATIONS

Spreadtrum Communications, "An Enhanced Scheduling Request Method for V2X," 3GPP TSG RAN WG1 meeting #14 bis, dated Apr. 11-15, 2016, 4 pages.
(Continued)

*Primary Examiner* — Faruk Hamza
*Assistant Examiner* — Aixa A Guadalupe Cruz
(74) *Attorney, Agent, or Firm* — Fish & Richardson P.C.

(57) ABSTRACT

One embodiment of a modification of a semi-persistent scheduling (SPS) operation triggered by a terminal in a wireless communication system may be a single hybrid automatic repeat request (HARQ) process according to a plurality of SPS configurations. In other words, an eNodeB (eNB) can provide, to a UE, the plurality of SPS configurations covering a variety of message sizes. Another embodiment of a modification of an SPS operation triggered by a terminal may be a negative acknowledgement (NACK) with respect to a single HARQ process according to a plurality of SPS configurations and an SPS resource grant. In other words, an eNB provides, to a UE, the plurality of SPS configurations covering a dynamic reconfiguration of a message generation period, and whenever a specific SPS
(Continued)

resource grant is not used for transmission, the terminal can transmit the NACK with respect to the SPS resource grant.

8 Claims, 12 Drawing Sheets

(51) Int. Cl.
| | |
|---|---|
| *H04W 76/11* | (2018.01) |
| *H04W 4/40* | (2018.01) |
| *H04W 76/27* | (2018.01) |
| *H04L 1/18* | (2006.01) |
| *H04L 5/00* | (2006.01) |
| *H04W 28/02* | (2009.01) |
| *H04W 68/02* | (2009.01) |
| *H04W 80/02* | (2009.01) |
| *H04W 72/12* | (2009.01) |

(52) U.S. Cl.
CPC .............. *H04L 5/0055* (2013.01); *H04W 4/40* (2018.02); *H04W 28/0278* (2013.01); *H04W 68/02* (2013.01); *H04W 72/042* (2013.01); *H04W 72/0406* (2013.01); *H04W 76/11* (2018.02); *H04W 76/27* (2018.02); *H04W 80/02* (2013.01); *H04W 72/1284* (2013.01)

(56) References Cited

U.S. PATENT DOCUMENTS

| | | |
|---|---|---|
| 2012/0069805 A1 | 3/2012 | Feuersanger et al. |
| 2012/0147838 A1 | 6/2012 | Qin et al. |
| 2013/0210422 A1 | 8/2013 | Pani et al. |
| 2014/0003379 A1 | 1/2014 | Kang et al. |
| 2015/0098341 A1 | 4/2015 | Ramkumar et al. |
| 2015/0173048 A1 | 6/2015 | Seo et al. |
| 2015/0215944 A1 | 7/2015 | Kim et al. |
| 2015/0223212 A1 | 8/2015 | Velde et al. |
| 2015/0296411 A1 | 10/2015 | Meyer et al. |
| 2015/0372798 A1 | 12/2015 | Zhao et al. |
| 2017/0019914 A1 | 1/2017 | Rune et al. |
| 2017/0289733 A1 | 10/2017 | Rajagopal et al. |
| 2019/0014563 A1 | 1/2019 | Lee et al. |
| 2019/0045507 A1* | 2/2019 | Sorrentino ............ H04W 48/12 |
| 2019/0116609 A1* | 4/2019 | Feng ...................... H04W 4/46 |

OTHER PUBLICATIONS

Section 5.10 Semi-Persistent Scheduling, 3GPP TS 36.321 V13.0.0, Dec. 2015, 4 pages.

Sections 11.1.1 and 11.1.2, 3GPP TS 36.300 V13.2.0, Dec. 2015, 4 pages.

Translation of International Search Report in International Application No. PCT/KR2017/004350, dated Jul. 18, 2017, 2 pages.

U.S. Office Action in U.S. Appl. No. 16/097,774, dated Nov. 21, 2019, 11 pages.

United States Notice of Allowance in U.S. Appl. No. 16/097,774, dated Mar. 18, 2020, 12 pages.

* cited by examiner

METHOD AND APPARATUS FOR CHANGING SPS OPERATION IN WIRELESS COMMUNICATION SYSTEM

CROSS-REFERENCE TO RELATED APPLICATIONS

This application is a National Stage application under 35 U.S.C. § 371 of International Application No. PCT/KR2017/004350, filed on Apr. 25, 2017, which claims the benefit of U.S. Provisional Application No. 62/330,255, filed on May 2, 2016. The disclosures of the prior applications are incorporated by reference in their entirety.

BACKGROUND OF THE INVENTION

Field of the Invention

The present invention relates to wireless communications and, more particularly, to a method and an apparatus for changing a semi-persistent scheduling (SPS) operation triggered by a user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

Semi-persistent (SPS) is a function for considerably reducing a control channel overhead of an application which requires consistent wireless resource allocation, such as voice over Internet protocol (VoIP). If the SPS is not given, every downlink (DL) or uplink (UL) physical resource block (PRB) allocation needs to be permitted through an access grant message on a physical downlink control channel (PDCCH). This is sufficient for most of bursty best effort type applications having a big packet size, and thus, only a few users are usually scheduled in each subframe. However, in the case of an application which requires consistent allocation of a small packet (e.g. VoIP), an access grant overhead of a control channel may be greatly reduced by the SPS. That is, the SPS introduces permanent RPB allocation which is expected by a user from the DL or which can be transmitted from the UL. There are various methods in which the SPS is able to set consistent allocation.

Since a message has a relatively small size and is periodically transmitted in V2X communication, a method for transmitting a V2X message through a resource allocated by the SPS is being discussed.

SUMMARY OF THE INVENTION

The present invention provides a method and an apparatus for changing a semi-persistent scheduling (SPS) operation triggered by a user equipment (UE) in a wireless communication system. The present invention provides a method and an apparatus for, in response to change of a message size, changing an SPS operation according to a plurality of SPS configurations supporting different message sizes. In addition, the present invention provides a method and an apparatus for, in response to change of a message generating time and/or period, changing an SPS operation according to a plurality of SPS configurations configuring different SPS periods.

In an aspect, a method for performing a semi-persistent scheduling (SPS) operation by a user equipment (UE) in a wireless communication system is provided. The method includes receiving a first SPS configuration supporting a first size of a message and a second SPS configuration supporting a second size of the message, detecting that a size of the message has been changed based on a threshold, transmitting an SPS change request to the network, and receiving a message which releases the first SPS configuration and activates the second SPS configuration from the network.

In another aspect, a method for performing a semi-persistent scheduling (SPS) operation by a user equipment (UE) in a wireless communication system is provided. The method includes receiving a first SPS configuration configuring a first SPS period and a second SPS configuration configuring a second SPS period from a network, detecting that a generating period of a message has been changed, transmitting an SPS change request to the network, and receiving a message which releases the first SPS configuration and activates the second SPS configuration from the network.

V2X communication can be efficiently performed using an SPS resource.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
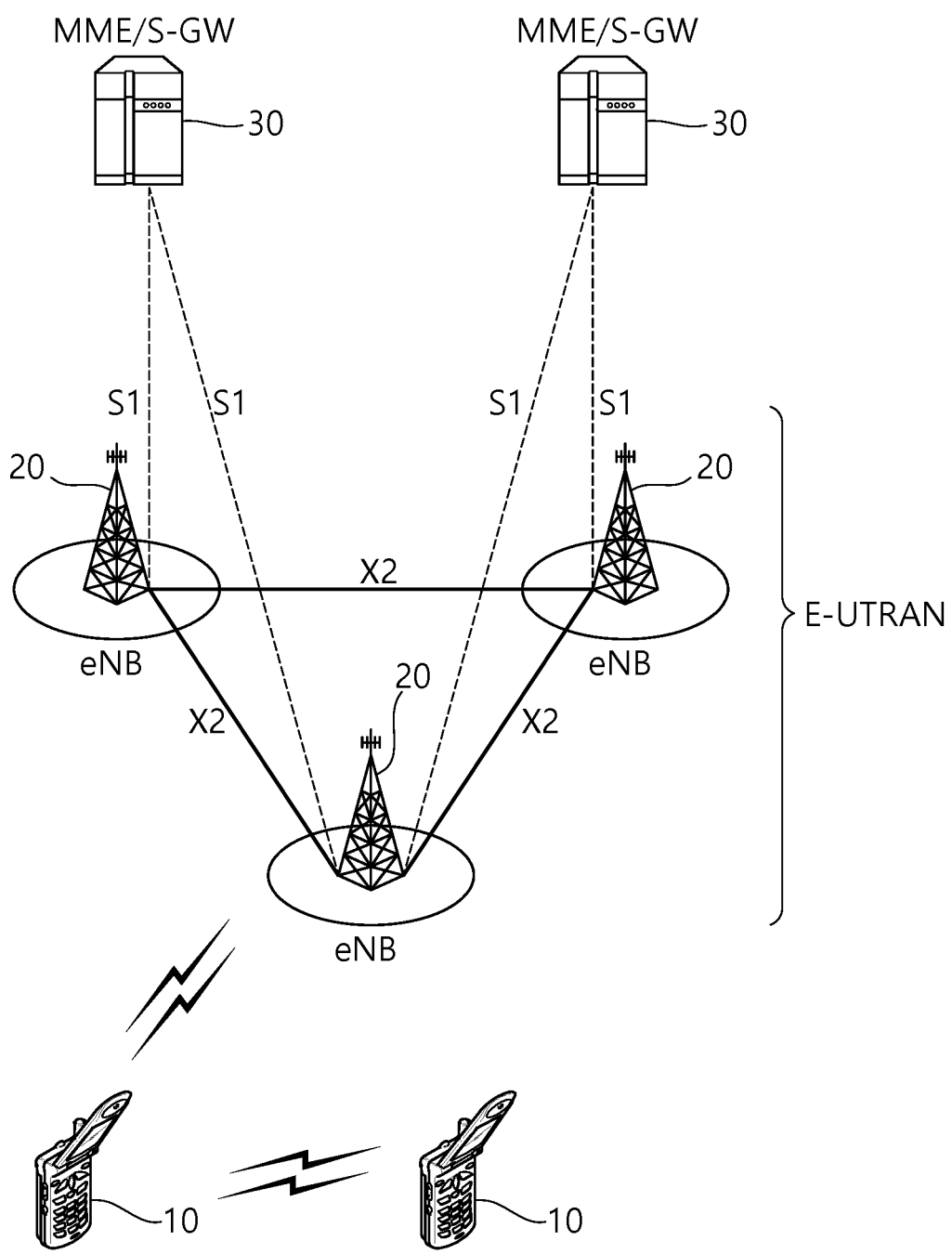
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
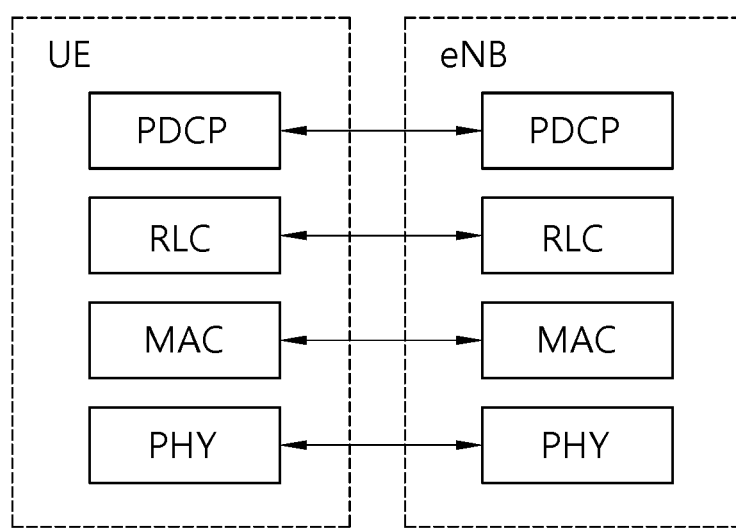
FIG. 2 shows a block diagram of a user plane protocol stack of an LTE system.
Figure 3:
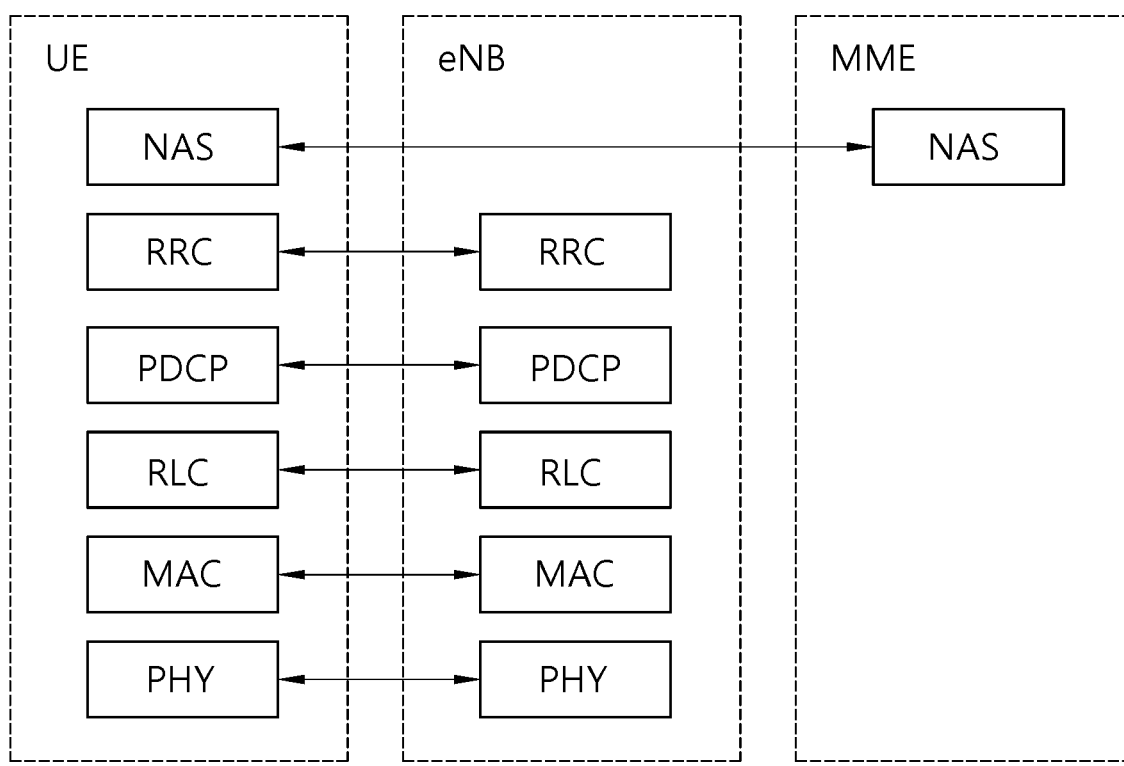
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARD). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling ProSe direct communication, between two or more nearby UEs, using E-UTRA technology but not traversing any network node. Sidelink discovery is AS functionality enabling ProSe direct discovery, using E-UTRA technology but not traversing any network node. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Semi-persistent scheduling (SPS) is described. It may be referred to as 3GPP TS 36.300 V13.2.0 (2015-12) Section 11.1.1, 11.1.2 and 3GPP TS 36.321 V13.0.0 (2015-12) Section 5.10. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided:

SPS C-RNTI;

UL SPS interval semiPersistSchedIntervalUL and number of empty transmissions before implicit release implicitReleaseAfter, if SPS is enabled for the UL;

Whether twoIntervalsConfig is enabled or disabled for UL, only for time division duplex (TDD);

DL SPS interval semiPersistSchedIntervalDL and number of configured HARQ processes for SPS numberOfConfSPS-Processes, if SPS is enabled for the DL;

When SPS for UL or DL is disabled by RRC, the corresponding configured grant or configured assignment shall be discarded.

The above information may be carried in SPS-Config information element (IE). The IE SPS-Config is used to specify the SPS configuration. Table 1 shows the SPS-Config IE.

TABLE 1

```
-- ASN1START
SPS-Config ::=   SEQUENCE {
  semiPersistSchedC-RNTI    C-RNTI                OPTIONAL, -- Need OR
  sps-ConfigDL              SPS-ConfigDL          OPTIONAL, -- Need ON
  sps-ConfigUL              SPS-ConfigUL          OPTIONAL, -- Need ON
}
SPS-ConfigDL ::= CHOICE{
  release     NULL,
  setup       SEQUENCE {
    semiPersistSchedIntervalDL       ENUMERATED {
                                       sf10, sf20, sf32, sf40, sf64, sf80,
                                       sf128, sf160, sf320, sf640, spare6,
                                       spare5, spare4, spare3, spare2,
                                       spare1},
    numberOfConfSPS-Processes        INTEGER (1..8),
    n1PUCCH-AN-PersistentList        N1PUCCH-AN-PersistentList,
    ...,
    [[ twoAntennaPortActivated-r10    CHOICE {
         release                        NULL,
         setup                          SEQUENCE {
           n1PUCCH-AN-PersistentListP1-r10    N1PUCCH-AN-PersistentList
         }
       }
    ]]                                                  OPTIONAL -- Need ON
  }
}
SPS-ConfigUL ::= CHOICE {
  release                    NULL,
  setup                      SEQUENCE {
    semiPersistSchedIntervalUL     ENUMERATED {
                                     sf10, sf20, sf32, sf40, sf64, sf80,
                                     sf128, sf160, sf320, sf640, spare6,
                                     spare5, spare4, spare3, spare2,
                                     spare1},
    implicitReleaseAfter           ENUMERATED {e2, e3, e4, e8},
    p0-Persistent                  SEQUENCE {
      p0-NominalPUSCH-Persistent     INTEGER (-126..24),
      p0-UE-PUSCH-Persistent         INTEGER (-8..7)
    }                                                   OPTIONAL, -- Need OP
    twoIntervalsconfig             ENUMERATED {true}    OPTIONAL, -- Cond TDD
    ...,
    [[ p0-PersistentSubframeSet2-r12   CHOICE {
         release                         NULL,
         setup                           SEQUENCE {
           p0-NominalPUSCH-PersistentSubframeSet2-r12    INTEGER (-126..24),
           p0-UE-PUSCH-PersistentSubframeSet2-r12        INTEGER (-8..7)
         }
       }
    ]]                                                  OPTIONAL -- Need ON
  }
}
N1PUCCH-AN-PersistentList ::=        SEQUENCE (SIZE (1..4)) OF INTEGER (0..2047)
-- ASN1STOP
```

As described above, the SPS-Config IE may include at least one of SPS C-RNTI (semiPersistSchedC-RNTI), UL SPS interval (semiPersistSchedIntervalUL) and number of empty transmissions before implicit release (implicitReleaseAfter), whether twoIntervalsConfig is enabled or disabled for UL (twoIntervalsConfig), and DL SPS interval (semiPersistSchedIntervalDL) and number of configured HARQ processes for SPS (numberOfConfSPS-Processes), if SPS is enabled for the DL.

After a SPS DL assignment is configured, the MAC entity shall consider sequentially that the $N^{th}$ assignment occurs in the subframe for which:

$$(10*SFN+subframe)=[(10*SFN_{start\ time}+subframe_{start\ time})+N*semiPersistSchedIntervalDL]\ modulo\ 10240,$$

where $SFN_{start\ time}$ and $subframe_{start\ time}$ are the system frame number (SFN) and subframe, respectively, at the time the configured DL assignment were (re-)initialized.

After a SPS UL grant is configured, the MAC entity shall:
1> if twoIntervalsConfig is enabled by upper layer:
2> set the Subframe Offset according to Table 3 below.

TABLE 3

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | -1 |
| 2 | Subframe 2 | 5 |
|   | Subframe 7 | -5 |
| 3 | Subframes 2 and 3 | 1 |
|   | Subframe 4 | -2 |
| 4 | Subframe 2 | 1 |
|   | Subframe 3 | -1 |
| 5 | N/A | 0 |
| 6 | N/A | 0 |

1> else:
2> set Subframe Offset to 0.

1> consider sequentially that the $N^{th}$ grant occurs in the subframe for which:

2> $(10*SFN+subframe)=[(10*SFN_{start\ time}+subframe_{start\ time})+N*semiPersistSchedIntervalUL+Subframe\ Offset*(N\ modulo\ 2)]\ modulo\ 10240$, where $SFN_{start\ time}$ and $subframe_{start\ time}$ are the SFN and subframe, respectively, at the time the configured uplink grant were (re-)initialized.

The MAC entity shall clear the configured UL grant immediately after implicitReleaseAfter number of consecutive new MAC PDUs each containing zero MAC SDUs have been provided by the multiplexing and assembly entity, on the SPS resource.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

In V2X communication, messages such as common awareness messages (CAM), decentralized environmental notification messages (DENM), or basic safety messages (BSM) may be transmitted. The CAM includes information on a vehicle's type, a location, speed, a direction, etc., and may be periodically broadcasted by any vehicle. The DENM includes information on a type of a particular event and an area where the particular event has occurred, and may be broadcasted by an RSU or a vehicle. The BSM is included in the U.S. J2735 basic safety message, and have similar characteristics to those of the CAM. Through the BSM, an emergency brake warning, a front collision warning, an intersection safety support, a blind spot and line departure warning, a overtake warning, an out-of-control warning service may be provided.

Hereinafter, various embodiments of a method for transmitting a V2X message using SPS are described. More specifically, described are various embodiments in which change of an SPS operation is triggered by a UE when a V2X message is transmitted using SPS.

1. SPS Reactivation Triggered by a UE in Response to Timing Change

After an eNB activates SPS by a PDCCH addressed by an SPS C-RNTI, an SPS resource grant may be periodically generated. However, since the eNB is not able to know when the UE generates a periodic message, an SPS resource grant allocated by the eNB and an actual message generating time may not match exactly. Such inconsistency between the message generating time and the SPS resource grant may cause delay of a V2V service.

That is, considering strict V2V requirements as to a delay, i.e. 100 ms, a method for supporting SPS reactivation by a UE in response to timing change may be proposed according to an embodiment of the present invention. When the UE detects considerable inconsistency between the actual message generating time and the SPS resource grant, the UE may request change of SPS from the eNB based on, e.g. a discard timer of L2 entity. In response to reception of the request, the eNB may resume SPS to change a timing of SPS resource allocation. That is, when the eNB resumes an SPS resource grant by a PDCCH addressed by an SPS C-RNTI, $SFN_{start\ time}$ and $subframe_{start\ time}$ may be changed.

In addition, a CAM may be periodically generated with a period which is dynamically changed between is and 100 ms. In addition, a CAM generating time may be dynamically changed. If the CAM generating time is changed, the UE may trigger an SPS change request so as to help the eNB to resume the SPS resource grant on time.

Figure 4:
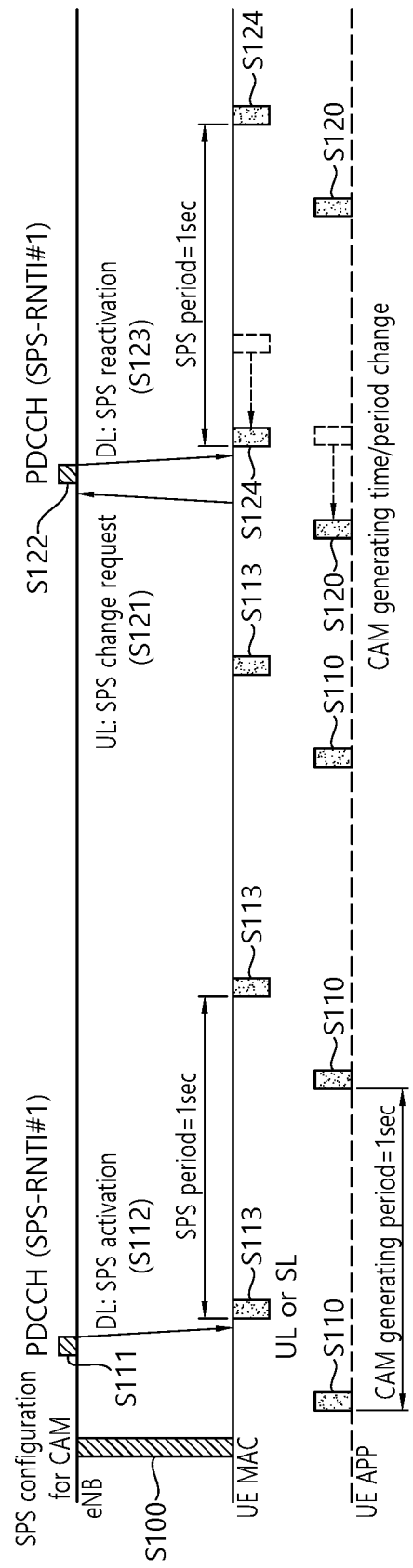
FIG. 4 shows SPS reactivation triggered by a UE in response to change of a timing of CAM transmission according to an embodiment of the present invention.

FIG. 4 shows SPS reactivation triggered by a UE in response to change of a timing of CAM transmission according to an embodiment of the present invention.

In step S100, an eNB transmits an SPS configuration for a CAM to a UE.

In step S110, a CAM is generated. A CAM generating period is assumed to be 1 s. The eNB constructs a PDCCH to be addressed to SPS C-RNTI #1 in step S111, and transmits SPS activation to the UE through the corresponding PDCCH in step S112. In response to reception of the SPS activation, the UE transmits the CAM through UL or SL using an SPS resource in step S113. An SPS period is assumed to be 1 s.

In step S120, the CAM generating time is changed. Accordingly, the UE transmits an SPS change request to the eNB in step S121. In step 122, the eNB constructs a PDCCH to be addressed to SPS C-RNTI #1 in step S122, and transmits SPS reactivation to the UE through the corresponding PDCCH in step S123. In response to reception of the SPS reactivation, the UE transmits the CAM through UL or SL using an SPS resource in step S124.

2. SPS Activation and Release Triggered by UE

Transmission of a DENM is triggered based on a particular event. The DENM is periodically generated in an identical period (e.g. 100 ms or 500 ms) until the event disappears. Thus, an eNB is not able to know when the transmission of the DENM is triggered or completed.

Considering an event trigger message in a V2V service, a method for supporting SPS activation and release by a UE may be proposed according to an embodiment of the present invention. When the UE detects start of transmission of a DENM, (e.g. detection of data available to be used for transmission through a logical channel mapped to the DENM), the UE may request SPS activation from an eNB. In response to reception of the request, the eNB may initiate SPS resource allocation. Afterwards, when the UE detects that there is no DENM to be transmitted (e.g. there is no data available to be used for transmission through a logical channel mapped to the DENM), the UE may request SPS release from the eNB. In response to reception of the request, the eNB may release SPS resource allocation.

Figure 5:
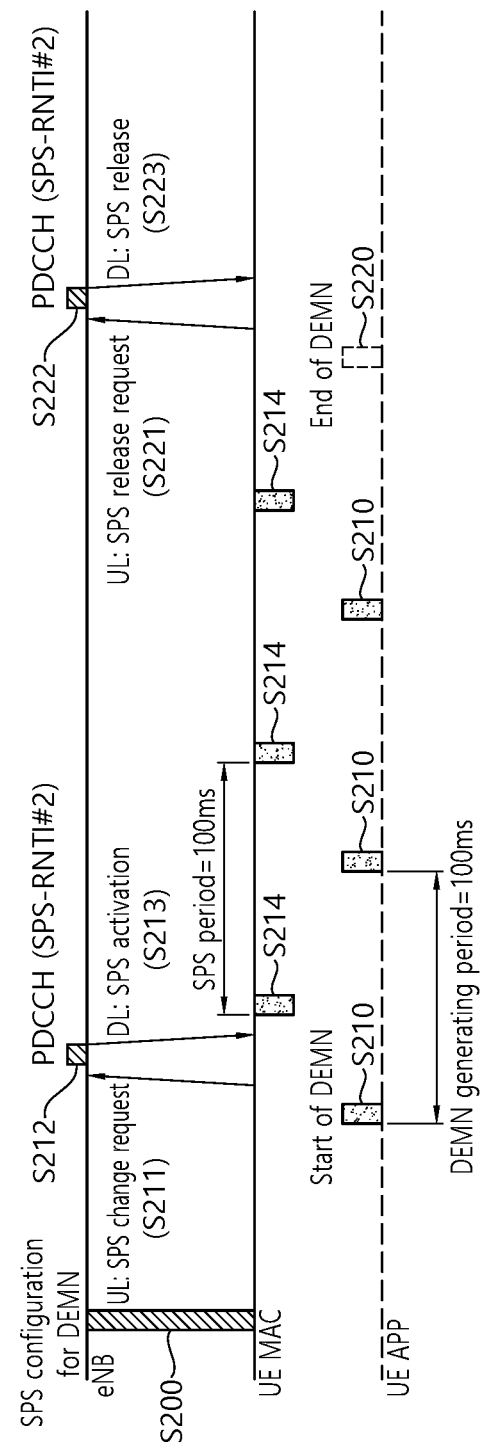
FIG. 5 shows SPS activation and release triggered by a UE for transmission of a DENM according to an embodiment of the present invention.

FIG. 5 shows SPS activation and release triggered by a UE for transmission of a DENM according to an embodiment of the present invention.

In step S200, an eNB transmits an SPS configuration for a DENM to a UE.

In step S210, a DENM starts to be generated. A generation period of the DENM is assumed to be 100 ms. In step S211, the UE transmits an SPS change request to the eNB. The eNB constructs a PDCCH to be addressed to SPS C-RNTI #2 in step S212, and transmits SPS activation through the corresponding PDCCH in step S213. In response to reception of the SPS activation, the UE transmits the DENM through UL or SL using an SPS resource in step S214. An SPS period is assumed to be 100 ms.

In step S220, generation of the DENM is terminated. Accordingly, the UE transmits an SPS release request to the eNB in step S221. The eNB constructs a PDCCH to be addressed to SPS C-RNTI #2 in step S222, and transmits SPS release to the UE through the corresponding PDCCH in step S223.

3. Non-Acknowledgement (NACK) with Respect to an SPS Resource Grant (i.e. Omission of SPS Transmission)

A BSM is periodically transmitted in a period of 100 ms. When a BSM generating time is not on time, there may be inconsistency between an actual message generating time and an SPS resource grant. If a BSM is generated after an SPS resource grant is constructed, at least one SPS resource grant may be wasted.

In order to prevent waste of an SPS resource grant in V2V transmission, a method for transmitting an NACK with respect to an SPS resource grant may be proposed according to an embodiment of the present invention. If a particular SPS resource grant has no data to be transmitted, the UE may transmit an NACK with respect to the SPS resource grant before occurrence of the SPS resource grant to inform the eNB that the UE would not use resource allocation for transmission. In response to reception of the NACK, the eNB may allocate an SPS resource grant to different transmission (e.g. a different UE). The same operation may be performed even when the UE transmits an ACK with respect to the SPS resource grant. That is, the UE may transmit a particular signal to the eNB in order to inform that a relevant SPS resource would be used for actual transmission. In this case, the absence of an ACK may be regarded as the presence of an NACK.

Figure 6:
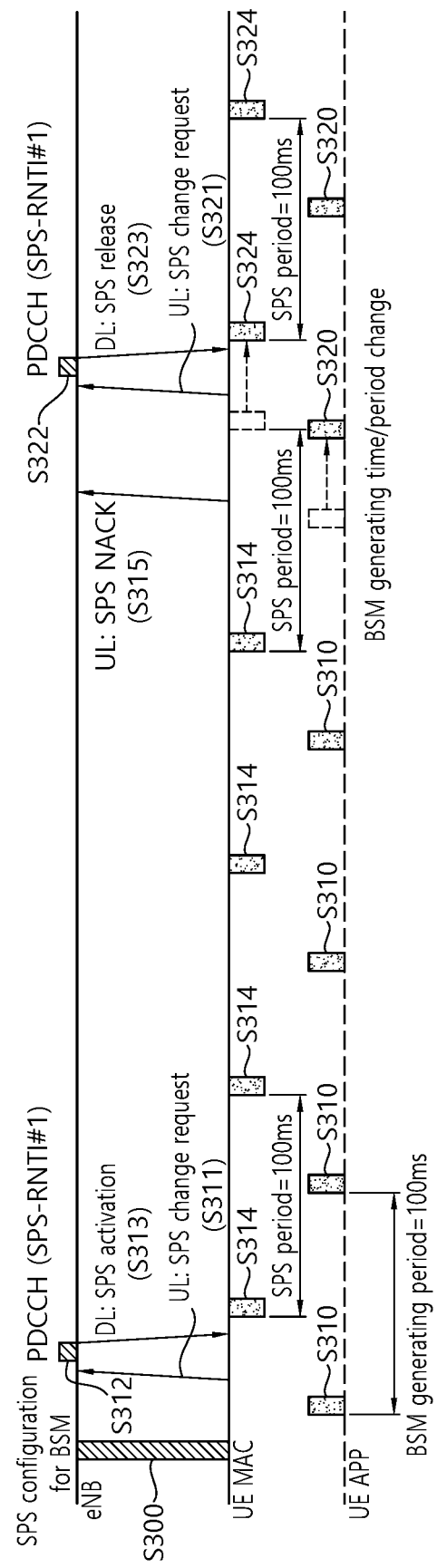
FIG. 6 shows an NACK transmitted with respect to an SPS resource grant for BSM transmission according to an embodiment of the present invention.

FIG. 6 shows an NACK transmitted with respect to an SPS resource grant for BSM transmission according to an embodiment of the present invention.

In step S300, an eNB transmits an SPS configuration for a BSM to a UE.

In step S310, a BSM is generated. A BSM generating period is assumed to be 100 ms. In step S311, the UE transmits an SPS change request to the eNB. The eNB constructs a PDCCH to be addressed to SPS C-RNTI #1 in step S312, and transmits SPS activation to the UE through the corresponding PDCCH in step S313. In response to reception of the SPS activation, the UE transmits the BSM through UL or SL using an SPS resource in step S314. An SPS period is assumed to be 100 ms.

In step S320, a BSM generating time is changed. Since there is no data to be transmitted, the UE transmits an SPS NACK to the eNB in step S315. The UE transmits an SPS change request to the eNB in step S321. The eNB constructs a PDCCH to be addressed to SPS C-RNTI #1 in step S322, and transmits SPS release to the UE through the corresponding PDCCH in step S323.

4. A Single HARQ Process According to a Plurality of SPS Configurations

A BSM is periodically transmitted with a period of 100 ms. However, an actual message size may differ depending on a time. If an SPS resource grant is not capable of accommodating the BSM due to change in the message size, a UE may request dynamic UL resource allocation, and accordingly, the advantage of using SPS for a V2V service may be weakened. In addition, SL transmission in Mode 1 does not support dynamic resource allocation.

Considering change of a message size in V2V transmission, a method for providing a plurality of SPS configurations covering various message sizes by an eNB to a UE may be proposed according to an embodiment of the present invention. When a message size is changed with reference to a threshold value (e.g. equal to or greater than/equal to or smaller than 150 bytes) with respect to a particular logical channel), the UE may request SPS change. For example, by reporting a size of L2 buffer or by indicating whether the message size is equal to or greater than/equal to or smaller than a threshold value signaled by the eNB, the UE may request SPS change. For example, when the size of the L2 buffer is changed to be equal to or greater than/equal to or smaller than a threshold value with respect to a particular logical channel constructed by the eNB, the UE may trigger a scheduling request (SR) and/or a buffer status report (BSR). Otherwise, the UE does not trigger the SR and/or the BSR with respect to the particular logical channel constructed by the eNB. In response to reception of the request, the eNB may release the current SPS resource grant according to an SPS configuration (e.g. supporting 150 bytes), and initiates a new SPS resource grant according to a different SPS configuration (e.g. supporting 400 bytes).

Meanwhile, the eNB may instruct SPS release and SPS initiation at the same time through transmission of a single PDCCH addressed by an SPS C-RNTI. Since the UE performs SPS transmission through a single HARQ process with respect to a plurality of SPS configurations mapped to a V2X service, start/activation of a new SPS resource grant according to a new SPS configuration may cause release of a previous SPS resource grant according to a previous SPS configuration. That is, a previous SPS configuration may be replaced by a new SPS configuration with respect to a particular HARQ process.

In addition, two different SPS C-RNTIs may be allocated to the UE. The eNB may activate a new SPS resource grant according to a new SPS configuration through a PDCCH addressed by an SPS C-RNTI which is allocated to the new SPS configuration.

Figure 7:
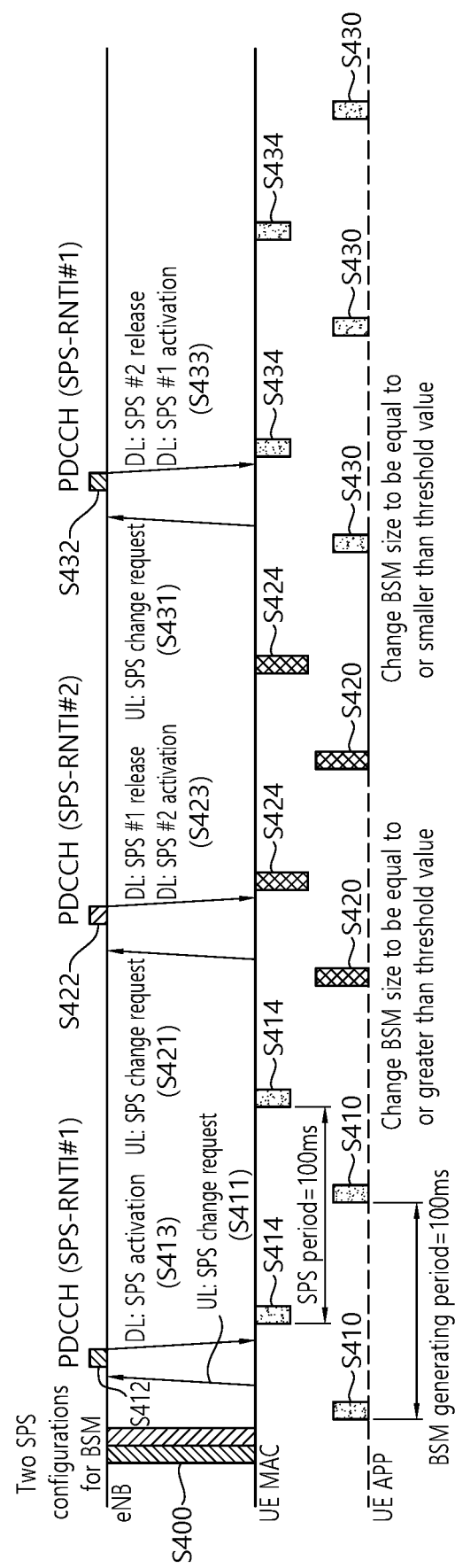
FIG. 7 shows a single SPS operation according to a plurality of SPS configurations for BSM transmission according to an embodiment of the present invention.

FIG. 7 shows a single SPS operation according to a plurality of SPS configurations for BSM transmission according to an embodiment of the present invention.

In step S400, an eNB transmits two SPS configurations for a BSM to a UE. It is assumed that a first SPS configuration supports an SPS resource capable of accommodating a message in a first size, and a second SPS configuration supports an SPS resource capable of accommodating a message in a second size. It is assumed that the second size is greater than the first size.

In step S410, a BSM is generated. A BSM generating period is assumed to be 100 ms. In this case, the generated BSM is assumed to be smaller than the first size. That is, the SPS resource according to the first SPS configuration may accommodate the BSM generated in step S410. In step S411, the UE transmits an SPS change request to the eNB. The eNB constructs a PDCCH to be addressed to SPS C-RNTI #1 in step S412, and transmits SPS activation to the UE through the corresponding PDCCH in step S413. In response to reception of the SPS activation, the UE transmits the BSM through UL or SL using an SPS resource according to the first SPS configuration in step S414. An SPS period is assumed to be 100 ms.

In step S420, the size of the BSM is changed to be equal to or greater than a threshold value. The changed BSM may be smaller than the second size but greater than the first size. That is, the SPS resource according to the second SPS configuration is capable of accommodating the changed BSM, but the SPS resource according to the first SPS configuration is not capable of accommodating the changed BSM. In step S421, the UE transmits an SPS change request to the eNB. The eNB constructs a PDCCH to be addressed to SPS C-RNTI #2 in step S422, and transmits SPS release with respect to the first SPS configuration and SPS activation with respect to the second SPS configuration to the UE through the corresponding PDCCH in step S423. In response to reception of the SPS activation with respect to the second SPS configuration, the UE transmits the BSM through UL or SL using the SPS resource according to the second SPS configuration in step S424.

In step S430, the size of the BSM is changed again to be smaller than the threshold value. The changed BSM may be smaller than the first size. That is, the SPS resource according to the first SPS configuration is capable of accommodating the changed BSM. In step S431, the UE transmits an SPS change request to the eNB. The eNB constructs a PDCCH to be addressed to SPS C-RNTI #1 in step S432, and transmits SPS release with respect to the second SPS configuration and SPS activation with respect to the first SPS configuration to the UE through the corresponding PDCCH in step S433. In response to reception of the SPS activation with respect to the first SPS configuration, the UE transmits the BSM through UL or SL using the SPS resource according to the first SPS configuration in step S434.

Figure 8:
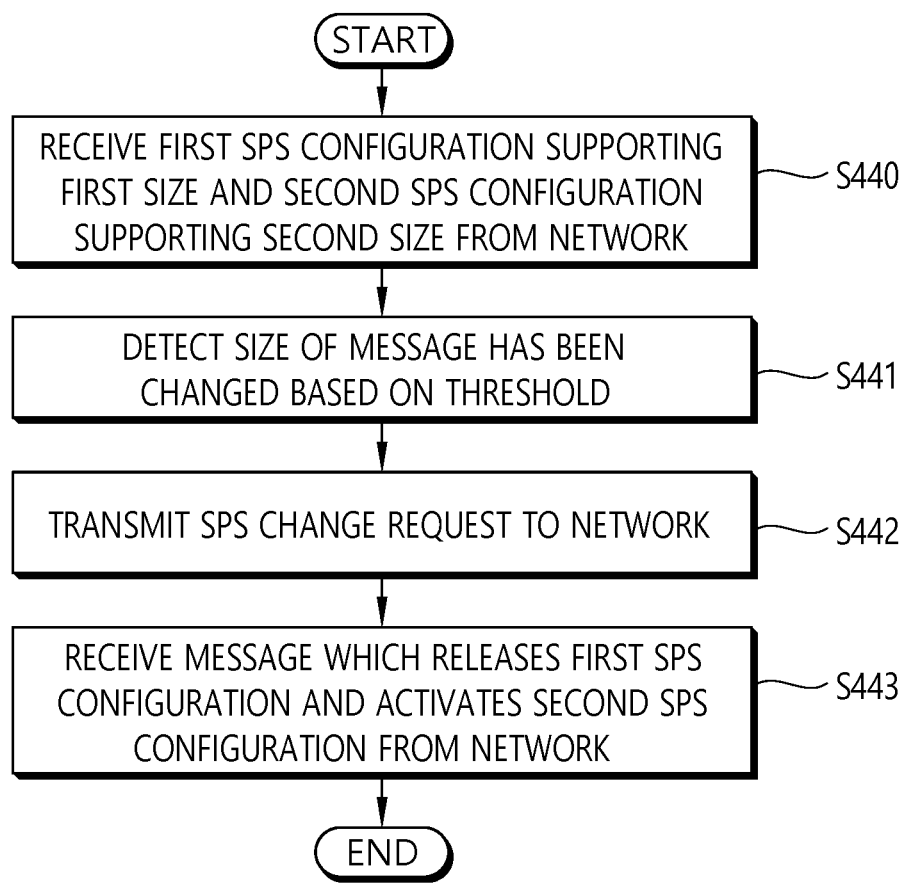
FIG. 8 shows a method for performing an SPS operation by a UE according to an embodiment of the present invention.

FIG. 8 shows a method for performing an SPS operation by a UE according to an embodiment of the present invention.

In step S440, the UE receives a first SPS configuration supporting a message in a first size, and a second configuration supporting a message in a second size from a network.

The first SPS configuration and the second SPS configuration may be configured in the same HARQ process. The first SPS configuration may be addressed by a first SPS C-RNTI, and the second SPS configuration may be addressed by a second SPS C-RNTI.

In step S441, the UE detects that a size of a message has been changed with reference to a threshold value. The size of the message may be changed to be equal to or greater than the threshold value, or may be changed to be equal to or smaller than the threshold value.

In step S442, the UE transmits a SPS change request to the network. Transmitting the SPS change request to the network may include informing that a size of an L2 buffer has been changed with reference to the threshold value. In addition, transmitting the SPS change request may include triggering an SR and/or a BSR toward the network.

In step S443, the UE may receive a message for releasing the first SPS configuration and activating the second SPS configuration from the network.

5. A Single HARQ Process According to a Plurality of SPS Configurations, and Transmission of an NACK with Respect to an SPS Resource Grant A CAM is periodically generated with a period that is dynamically changed between 1 s and 100 ms. For example, when a CAM generating period is changed from is to 100 ms, SPS resource allocation of is cannot match the CAM generating period.

Considering dynamic CAM generation according to a time, a method for providing a plurality of SPS configurations covering dynamic change of a CAM generating period by an eNB to a UE may be proposed according to an embodiment of the present invention. If the CAM generating period is changed to have a value to be shorter or longer than a particular logical channel, the UE may request SPS change to request of an SPS period to be changed to a shorter period or a longer period. That is, the UE may trigger a control of increasing/decreasing of the SPS period. For example, when the SPS period is changed, the UE may trigger an SR and/or a BSR. In response to reception of the request, the eNB may release the current SPS resource grant according to the current SPS configuration (e.g. an SPS period of 1 s) and initiate a new SPS resource grant according to a different SPS configuration (e.g., an SPS period of 100 ms).

It is assumed that the UE is not capable of estimating change of the CAM generating time accurately. The eNB may be not capable of even allocating an SPS resource grant that exactly matches with the dynamic CAM generation.

Thus, the UE is not able to use some SPS resource grants for transmission. In order to prevent waste of an SPS resource grant in V2V transmission, similarly to the proposal in the above option 3, a method for transmitting an NACK with respect to an SPS resource grant by the UE whenever a particular SPS resource grant is not used for transmission may be proposed according to an embodiment of the present invention. Whenever there is no data to be transmitted in the particular SPS resource grant, the UE may transmit an NACK with respect to the SPS resource grant, thereby informing the eNB that the UE would not use resource allocation for transmission. When receiving an NACK, the eNB may allocate the SPS resource grant to a different transmission (e.g. a different UE). When continuously receiving a plurality of NACKs with respect to different SPS resource grants, the eNB may release an SPS resource having a period of 100 ms, and activate allocation of an SPS resource having a longer period (e.g. 500 ms).

Meanwhile, the eNB may instruct both SPS release and SPS initiation through transmission of a single PDCCH addressed by an SPS C-RNTI. Since the UE performs SPS transmission through a single HARQ process with respect to a plurality of SPS configurations mapped to a V2X service, start/activation of a new SPS resource grant according to a new SPS configuration may cause release of a previous SPS resource grant according to a previous SPS configuration. That is, a previous SPS configuration may be replaced by a new SPS configuration with respect to a particular HARQ process.

In addition, two different SPS C-RNTIs may be allocated to the UE. The eNB may activate a new SPS resource grant according to a new SPS configuration through a PDCCH addressed by an SPS C-RNTI allocated to the new SPS configuration.

Figure 9:
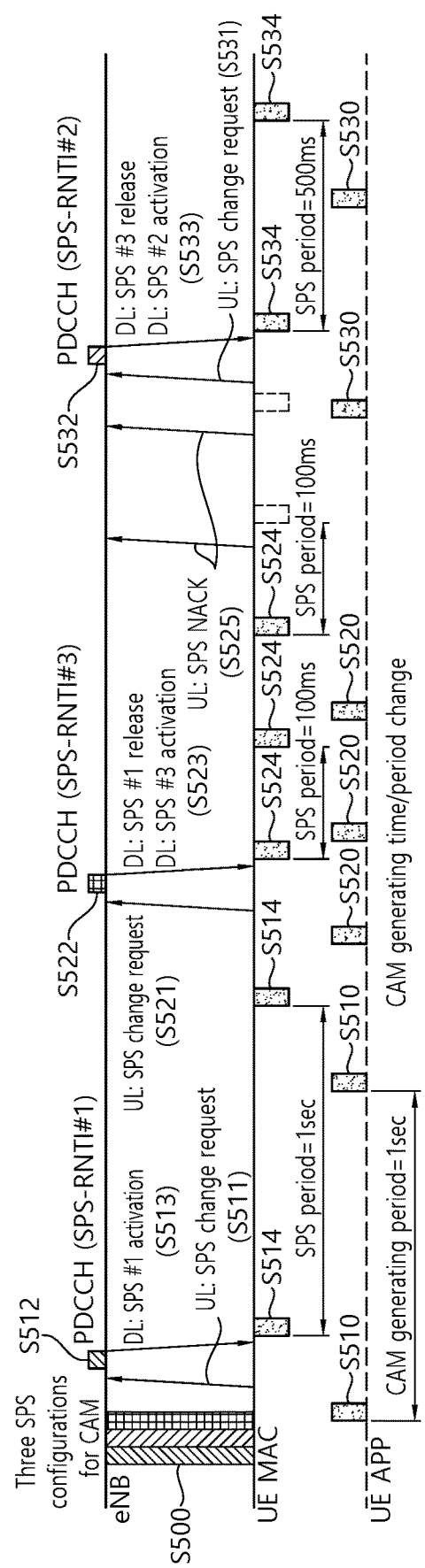
FIG. 9 shows a single SPS operation according to a plurality of SPS configurations for transmission of a CAM, and transmission of an NACK with respect to an SPS resource grant according to an embodiment of the present invention.

FIG. 9 shows a single SPS operation according to a plurality of SPS configurations for transmission of a CAM, and transmission of an NACK with respect to an SPS resource grant according to an embodiment of the present invention.

In step S500, an eNB transmits three SPS configurations for a CAM to a UE. It is assumed that a first SPS configuration supports an SPS resource of a first period, a second SPS configuration supports an SPS resource of a second period, and a third SPS configuration supports an SPS resource of a third period. In this embodiment, it is assumed that the first period is 1 s, the second period is 500 ms, and the third period is 100 ms.

In step S510, a CAM is generated. A CAM generating period is assumed to be 1 s. In step S511, the UE transmits an SPS change request to the eNB. The eNB constructs a PDCCH to be addressed to SPS C-RNTI #1 in step S512, and transmits SPS activation to the UE through the corresponding PDCCH in step S513. In response to reception of the SPS activation, the UE transmits the CAM through UL or SL using the SPS resource according to the first SPS configuration in step S514. According to the first SPS configuration which supports the first period, the CAM may be transmitted every 1 s.

In step S520, the CAM generating time/period is changed. It is assumed that the CAM generating time is reduced to be shorter than 1 s. In step S521, the UE transmits an SPS change request to the eNB. The eNB constructs a PDCCH to be addressed to SPS C-RNTI #3 in step S522, and transmits SPS release for the first SPS configuration and SPS activation for the third SPS configuration to the UE through the corresponding PDCCH I step S523. In response to reception of the SPS activation for the third SPS configuration, the UE transmits the CAM through UL or SL using the SPS resource according to the third SPS configuration in step S524. According to the third SPS configuration which supports the third period, the CAM may be transmitted every 100 ms.

In step S525, whenever there is no data to be transmitted in a particular SPS resource grant, the UE transmits an NACK with respect to the SPS resource grant. In this case, a plurality of NACKs may be continuously transmitted with respect to different SPS resource grants. When the plurality of NACKs is continuously transmitted, the CAM generating period may be changed to have a value to be longer in step S530. In step S531, the UE transmits an SPS change request to the eNB. The eNB constructs a PDCCH to be addressed to SPS C-RNTI #2 in step S532, and transmits SPS release for the third SPS configuration and SPS activation for the second SPS configuration to the UE through the corresponding PDCCH in step S533. In response to reception of the SPS activation for the second SPS configuration, the UE transmits the CAM through UL or SL using the SPS resource according to the second SPS configuration in step S534. According to the second SPS configuration which supports the second period, the CAM may be transmitted every 500 ms.

Figure 10:
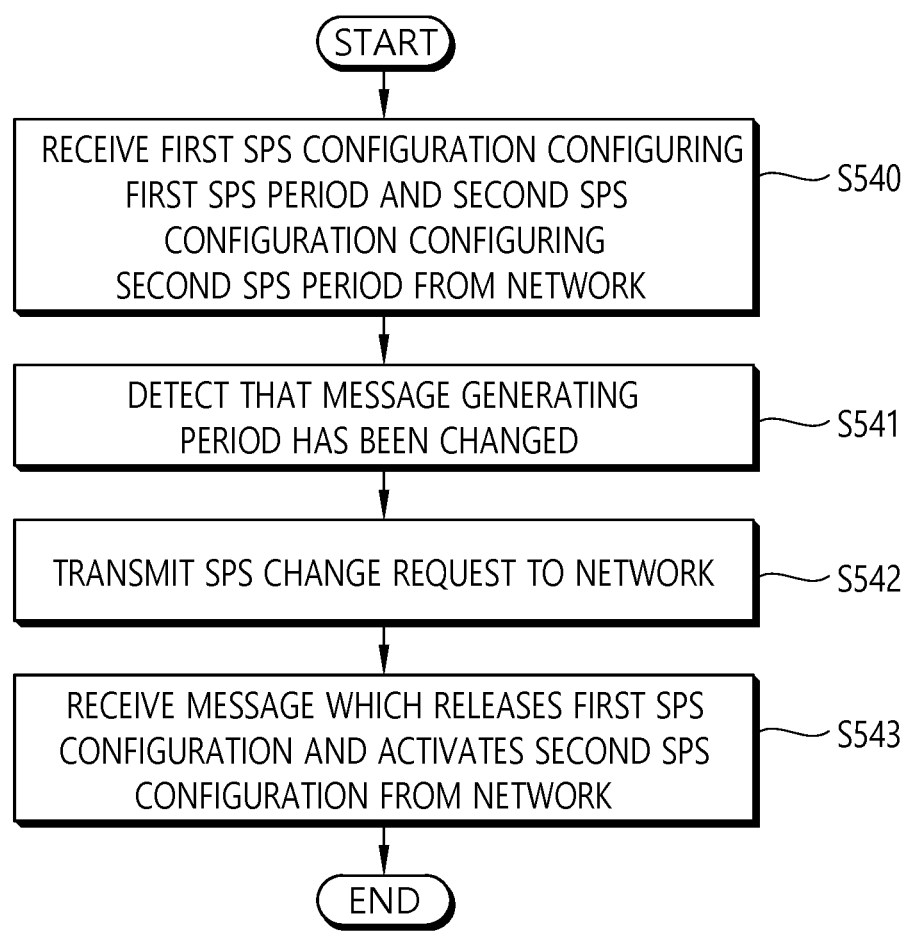
FIG. 10 shows a method for performing an SPS operation by a UE according to an embodiment of the present invention.

FIG. 10 shows a method for performing an SPS operation by a UE according to an embodiment of the present invention.

In step S540, a UE receives a first SPS configuration configuring a first SPS period and a second SPS configuration configuring a second SPS configuration from a network. The first SPS configuration and the second SPS configuration may be configured in the same HARQ process. The first SPS configuration may be addressed by a first SPS C-RNTI, and the second SPS configuration may be addressed by a second SPS C-RNTI.

In step S541, the UE detects that a message generating period has been changed.

In step S542, the UE transmits an SPS change request to the network. Transmitting the SPS change request to the network may include requesting change of an SPS period. In addition, transmitting the SPS change request to the network may include triggering an SR and/or BSR toward the network.

In step S543, the UE receives, from the network, a message for releasing the first SPS configuration and activating the second SPS configuration. In addition, whenever a particular SPS resource grant is not used for transmission, the UE may transmit an NACK with respect to the particular SPS grant to the network.

6. A Single HARQ Process According to Plurality of SPS Configurations, and Transmission of an ACK with Respect to an SPS Resource Grant The above options "5" and "6" are based on various SPS configuration. Difference between the options "5" and "6" is that an ACK instead of an NACK is used with respect to an SPS resource grant.

Whenever there is available data to be transmitted in a particular SPS resource grant for a particular SPS configuration (e.g. an SPS period shorter than 1 s), a UE may always transmit an ACK with respect to the SPS resource grant before the occurrence of the SPS resource grant, thereby informing the eNB that the UE would use resource allocation for transmission. If there is no available data to be transmitted in the particular resource grant for the particular SPS configuration, the UE may not transmit an ACK and the eNB may allocate the SPS resource grant for different transmission (e.g. a different UE).

When failing to continuously receive ACKs with respect to different SPS resource grants, the eNB may release an SPS resource with a period of 100 ms and activate allocation of an SPS resource with a longer period (e.g. 500 ms).

Figure 11:
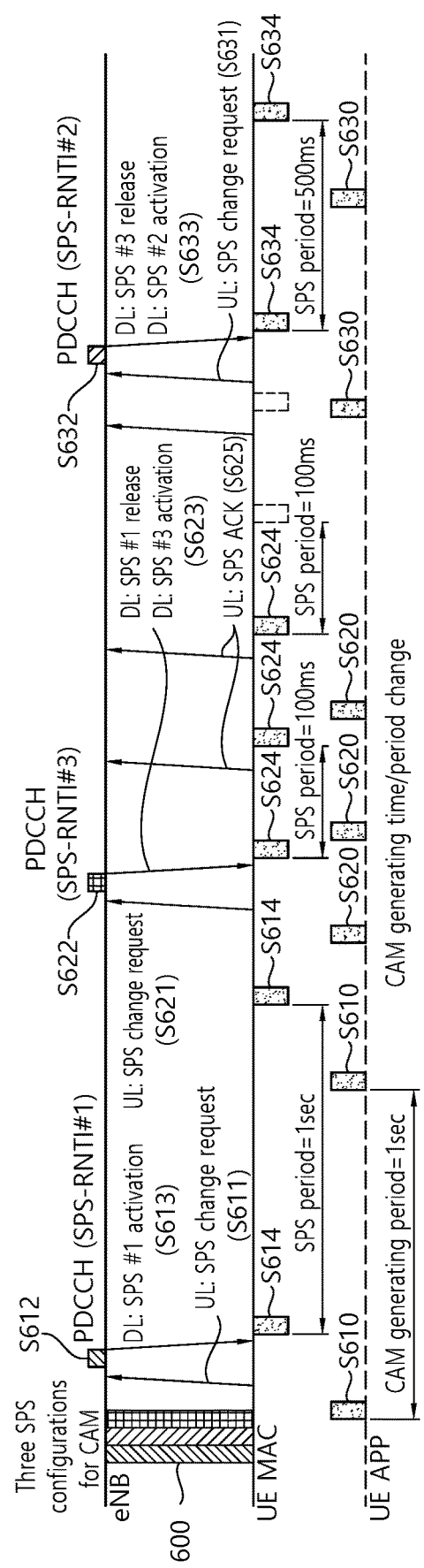
FIG. 11 shows a single SPS operation according to a plurality of SPS configurations for transmission of a CAM, and transmission of an ACK with respect to an SPS resource grant according to an embodiment of the present invention.

FIG. 11 shows a single SPS operation according to a plurality of SPS configurations for transmission of a CAM, and transmission of an ACK with respect to an SPS resource grant according to an embodiment of the present invention.

In step S600, an eNB transmits three SPS configurations for a CAM to a UE. It is assumed that a first SPS configuration supports an SPS resource of a first period, a second SPS configuration supports an SPS resource of a second period, and a third SPS configuration supports an SPS resource of a third period. In this embodiment, it is assumed that the first period is 1 s, the second period is 500 ms, and the third period is 100 ms.

In step S610, a CAM is generated. A CAM generating time is assumed to be 1 s. In step S611, the UE transmits an SPS change request to the eNB. The eNB constructs a PDCCH to be addressed to SPS C-RNTI #1 in step S612, and transmits SPS activation to the UE through the corresponding PDCCH in step S613. In response to reception of the SPS activation, the UE transmits the CAM through UL or SL using the SPS resource according to the first SPS configuration in step S614. According to the first SPS configuration which supports the first period, the CAM may be transmitted every 1 s.

In step S620, the CAM generating time/period is changed. It is assumed that the CAM generating period is reduced to be shorter than 1 s. In step S621, the UE transmits an SPS change request to the eNB. The eNB constructs a PDCCH to be addressed to SPS C-RNTI #3 in step S622, and transmits SPS release for the first SPS configuration and SPS activation for the third SPS configuration to the UE through the corresponding PDCCH in step S623. In response to reception of the SPS activation for the third SPS configuration, the UE transmits the CAM through UL or SL using the SPS resource according to the third SPS configuration in step S624. According to the third SPS configuration which supports the third period, the CAM may be transmitted every 100 ms.

In step S625, whenever there is available data to be transmitted in a particular SPS resource grant, the UE transmits an ACK with respect to the SPS resource grant. Whenever there is no available data to be transmitted in the particular SPS resource grant, the UE does not transmit an ACK. When the eNB continuously fails to receive an ACK, the CAM generating period may be changed to have a value to be longer in step S630. In step S631, the UE transmits an SPS change request to the eNB. The eNB constructs a PDCCH to be addressed to SPS C-RNTI #2 in step S632, and transmits SPS release for the third SPS configuration and SPS activation for the second SPS configuration to the UE through the corresponding PDCCH in step S633. In response to reception of the SPS activation for the second SPS configuration, the UE transmits the CAM through UL or SL using the SPS resource according to the second SPS configuration in step S634. According to the second SPS configuration which supports the second period, the CAM may be transmitted every 500 ms.

7. A Plurality of HARQ Processes According to a Plurality of SPS Configurations

A vehicle UE may generate a CAM and a DENM. At the same time, the vehicle UE may make a phone call, e.g. a voice call. Since the CAM, the DENM, and the voice call are different in terms of characteristics, a method for providing a plurality of SPS configurations to a UE such that each SPS configuration is allocated to a different HARQ process may be proposed according to an embodiment of the present invention.

For example, the UE may have five SPS configurations. Among them, three SPS configurations may be used to transmit the CAM through a first HARQ process, and another SPS configuration may be used to transmit the DENM through a second HARQ process. The last SPS configuration may be used to transmit a VoIP through a third HARQ process. An eNB may inform the UE of whether different SPS configurations are used for a single HARQ process (i.e. a single SPS operation) or for different HARQ processes.

In the above-described embodiment of the present invention, an SPS change/reactivation request, SPS activation, SPS release, SPS change in response to a change in an amount of L2 data equal to or greater than/equal to or smaller than a threshold value, an SPS period change, and an ACK/NACK in response to an SPS resource grant from the UE may be implemented by the following options.

(1) Physical uplink control channel (PUCCH) resource (e.g. SR)

(2) Transmission of random access preamble (3) Transmission of message 3 including a C-RNTI MAC control element (CE) in a random access procedure (4) Transmission of a random MAC CE (e.g. BSR, a power headroom report (PHR), a new CE)

(5) Transmission of uplink control information (UCI) in a physical uplink shared channel (PUSCH)

(6) MAC CE piggyback in MAC PDU transmitted in PUSCH

Figure 12:
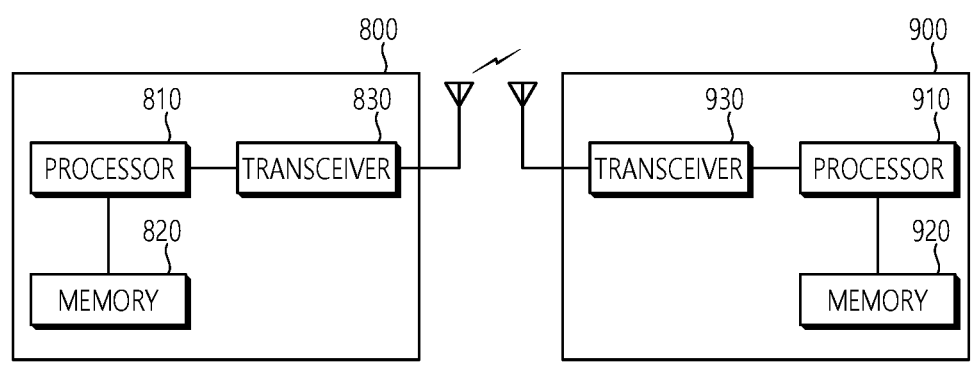
FIG. 12 shows a wireless communication system to implement an embodiment of the present invention.

The MAC CE in the above options may include an offset for the current SPS start time, i.e. a time difference between the current SPS resource allocation and resumed SPS resource allocation FIG. 12 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910.

The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
   receiving (i) first semi persistent scheduling (SPS) configuration supporting a first size of a message and (ii) a second SPS configuration supporting a second size of the message, wherein the first SPS configuration is addressed by a first SPS cell radio network temporary identity (SPS C-RNTI) and the second SPS configuration is addressed by a second SPS C-RNTI;
   detecting that a size of the message has been changed based on a threshold;
   transmitting an SPS change request to a network to inform that a size of a L2 buffer has been changed based on the threshold; and
   receiving, from the network through a PDCCH addressed by the second SPS C-RNTI, a control message which releases the first SPS configuration and activates the second SPS configuration,
   wherein the message is any one of decentralized environmental notification messages (DENM) or basic safety messages (BSM) used in a vehicle-to-everything (V2X) communication.

2. The method of claim 1, wherein the size of the message is changed to be greater than or equal to the threshold, or changed to be less than or equal to the threshold.

3. The method of claim 1, wherein the transmitting the SPS change request to the network comprises transmitting a scheduling request (SR) or a buffer status report (BSR) to the network.

4. The method of claim 1, wherein the first SPS configuration and the second SPS configuration are configured in a same hybrid automatic repeat request (HARQ) process.

5. A method performed by a wireless device in a wireless communication system, the method comprising:
   receiving, from a network, (i) first semi-persistent scheduling (SPS) configuration configuring a first SPS period and (ii) a second SPS configuration configuring a second SPS period, wherein the first SPS configuration is addressed by a first SPS cell radio network temporary identity (SPS C-RNTI) and the second SPS configuration is addressed by a second SPS C-RNTI;
   detecting that a generating period of a message has been changed;
   transmitting an SPS change request to a network;
   receiving, from the network through a PDCCH addressed by the second SPS C-RNTI, a control message which releases the first SPS configuration and activates the second SPS configuration; and
   transmitting a non-acknowledgement (NACK) for a particular SPS grant to the network based on that the particular SPS resource grant is not used for transmission,
   wherein the message is any one of decentralized environmental notification messages (DENM) or basic safety messages (BSM) used in a vehicle-to-everything (V2X) communication.

6. The method of claim 5, wherein the transmitting the SPS change request to the network comprises requesting change of an SPS period.

7. The method of claim 5, wherein the transmitting the SPS change request to the network comprises transmitting a scheduling request (SR) or a buffer status report (BSR) to the network.

8. The method of claim 5, wherein the first SPS configuration and the second SPS configuration are configured in a same hybrid automatic repeat request (HARQ) process.

* * * * *